United States Patent
Allison et al.

(10) Patent No.: US 7,097,723 B2
(45) Date of Patent: *Aug. 29, 2006

(54) LIGHTWEIGHT ACOUSTIC AUTOMOTIVE CARPET

(75) Inventors: Timothy J. Allison, Old Fort, NC (US); Carroll L. Owenby, Old Fort, NC (US); Ernie Wilson, Albemarle, NC (US); Ronnie O. Lash, Marion, NC (US)

(73) Assignee: Collins & Aikman Products Co., Southfield, MI (US)

( * ) Notice: Subject to any disclaimer, the term of this patent is extended or adjusted under 35 U.S.C. 154(b) by 100 days.

This patent is subject to a terminal disclaimer.

(21) Appl. No.: 10/851,479

(22) Filed: May 21, 2004

(65) Prior Publication Data

US 2005/0051264 A1  Mar. 10, 2005

Related U.S. Application Data (63) Continuation-in-part of application No. 10/253,373, filed on Sep. 24, 2002, now Pat. No. 6,821,366.

(60) Provisional application No. 60/333,595, filed on Nov. 26, 2001.

(51) Int. Cl.
*A47G 27/02* (2006.01)
*B32B 3/10* (2006.01)
*B32B 31/16* (2006.01)

(52) U.S. Cl. .................. 156/72; 156/285; 156/309.9; 264/101; 428/95; 428/96

(58) Field of Classification Search .............. None
See application file for complete search history.

(56) References Cited

U.S. PATENT DOCUMENTS

| | | | |
|---|---|---|---|
| 3,645,948 A | 2/1972 | Stahl | 260/28.5 |
| 3,673,034 A | 6/1972 | Squier | |
| 4,016,318 A | 4/1977 | DiGioia et al. | 428/95 |
| 4,242,395 A | 12/1980 | Zuckerman et al. | 428/96 |
| 4,335,034 A | 6/1982 | Zuckerman et al. | 524/23 |
| 4,508,771 A | 4/1985 | Peoples, Jr. et al. | 428/95 |
| 4,529,639 A | 7/1985 | Peoples et al. | 428/95 |
| 4,563,378 A | 1/1986 | Roth | 428/86 |
| 4,576,853 A | 3/1986 | Vaughn et al. | 428/181 |
| 4,579,764 A | 4/1986 | Peoples, Jr. et al. | 428/95 |

(Continued)

FOREIGN PATENT DOCUMENTS

DE  2006741 B2  2/1970

(Continued)

*Primary Examiner*—Sam Chuan Yao
(74) *Attorney, Agent, or Firm*—Grossman, Tucker, Perreault & Pfleger, PLLC (57) ABSTRACT

Light weight acoustic carpet including porous carpeting backed by a primary sound reducing layer and localized secondary insulators for use within vehicles, and methods of making same, are provided. A porous carpet structure including a carpet backing is heated to achieve a fluid or semi-fluid state and then subjected to intense vacuum to draw air through the carpet backing to create a porous structure. A layer of sound absorbing or insulating material may be applied to the porous carpet structure to provide improved acoustic properties. Secondary sound reducing absorbers/insulators may further be included as part of the molding process to provide selected areas of increased thickness and provide tailoring of sound attenuation.

22 Claims, 7 Drawing Sheets

U.S. PATENT DOCUMENTS

| | | | | |
|---|---|---|---|---|
| 4,845,133 A * | 7/1989 | Priester et al. | ............... | 521/167 |
| 4,851,283 A | 7/1989 | Holtrop et al. | ............. | 428/284 |
| 5,071,608 A | 12/1991 | Smith et al. | ................ | 264/119 |
| 5,086,082 A * | 2/1992 | Stone | ......................... | 521/107 |
| 5,256,224 A | 10/1993 | Gillyns et al. | ................. | 156/72 |
| 5,283,097 A | 2/1994 | Gillyns et al. | ................. | 428/91 |
| 5,298,694 A | 3/1994 | Thompson et al. | ......... | 181/286 |
| 5,439,725 A | 8/1995 | Roberts | ........................ | 428/95 |
| 5,476,711 A | 12/1995 | Hebbard et al. | ............ | 428/283 |
| 5,498,667 A | 3/1996 | David et al. | ................ | 525/166 |
| 5,534,145 A | 7/1996 | Boyles | ......................... | 210/90 |
| 5,578,648 A | 11/1996 | Beyer et al. | ................ | 521/45.5 |
| 5,591,802 A | 1/1997 | David et al. | ................ | 525/66 |
| 5,677,027 A | 10/1997 | Masuda et al. | ............ | 428/96 |
| 5,749,993 A | 5/1998 | Denney et al. | ............. | 156/214 |
| 5,817,408 A | 10/1998 | Orimo et al. | ................ | 428/218 |
| 5,876,826 A | 3/1999 | Hoffmann et al. | ............ | 428/95 |
| 5,958,548 A | 9/1999 | Negola et al. | ................ | 428/92 |
| 6,329,039 B1 | 12/2001 | Rossingnoli | .................. | 428/95 |
| 6,548,141 B1 | 4/2003 | Nagata et al. | ................ | 428/95 |
| 6,631,785 B1 | 10/2003 | Khambete et al. | .......... | 181/290 |
| 2002/0134486 A1 * | 9/2002 | Brumbelow et al. | .......... | 156/79 |
| 2003/0096079 A1 | 5/2003 | Messina et al. | ................ | 428/85 |
| 2003/0099810 A1 | 5/2003 | Allison et al. | ................ | 428/95 |
| 2004/0265566 A1 * | 12/2004 | Wyerman | ................ | 428/317.9 |

FOREIGN PATENT DOCUMENTS

| | | |
|---|---|---|
| EP | 255332 A2 * | 3/1988 |
| JP | 58183330 A2 | 10/1983 |

* cited by examiner

LIGHTWEIGHT ACOUSTIC AUTOMOTIVE CARPET

CROSS-REFERENCE TO RELATED APPLICATION

This application is a continuation-in-part of U.S. application Ser. No. 10/253,373, filed Sep. 24, 2002 now U.S. Pat. No. 6,821,366 B2, entitled "Porous Carpeting For Vehicles And Methods Of Producing Same", which claims the benefit of U.S. Provisional Application No. 60/333,594 filed Nov. 26, 2001, the disclosures of which are incorporated herein by reference in their entirety as if set forth fully herein.

TECHNICAL FIELD

The present invention relates generally to vehicles and, particularly, to methods of producing carpeting utilized within vehicles, and more particularly, to the construction of light weight moldable carpeting having exceptional sound attenuating properties which may further include secondary sound reducing insulators combined in a molding process.

BACKGROUND OF THE INVENTION

It is generally considered desirable to reduce the level of noise within a vehicle passenger compartment. External noises, such as road noise, engine noise, vibrations, etc., as well as noises emanating from within passenger compartments, may be attenuated through the use of various acoustical materials. Accordingly, sound attenuating materials for vehicles, such as automobiles, are conventionally used in dashboards, in conjunction with carpeting for floor panels, in wheel wells, in trunk compartments, under hoods, as part of headliners, etc.

The attenuation of external noise (i.e., noise emanating from a source external to a vehicle compartment) is conventionally referred to as sound transmission loss (STL). The attenuation of internal noise (i.e., noise emanating from within a vehicle compartment) is conventionally referred to as sound absorption. The acoustic-impedance of a material is defined as material density times acoustic velocity, and is expressed in units of Rayls (Newton-seconds/meter.sup.3). Acoustic impedance defines how easy it is for air to move through a material. Thus, for fibrous materials, acoustic impedance may depend upon the density of the fibrous material and fiber diameter. Generally, the heavier the blanket and the finer the fibers, the higher the acoustic impedance. Moreover, thicker layers typically have more acoustic impedance than thin layers. The ability of a material to attenuate noise is conventionally defined by the material's collective STL, acoustic impedance, and absorption characteristics.

Carpeting for use within vehicles is conventionally tufted or nonwoven. Tufted carpet generally includes a composite structure in which tufts, or bundles of carpet fibers are introduced (such as by stitching) into a primary backing, such as a woven or non-woven fabric. A secondary backing or coating of thermoplastic material is then applied to the underside of the carpet construction in order to securely retain the tufted material in the primary backing. This secondary backing not only dimensionally stabilizes the construction but may also provide greater abrasion and wear resistance, and may serve as an adhesive for an additional layer of material. Nonwoven carpet is composed of fiber that is mechanically entangled by needling, water jet, or other processes.

Vehicle carpeting is conventionally molded into a non-planar three dimensional contoured configuration which conforms to the contours of a vehicle floor. A secondary coating of thermoplastic material applied to the primary backing may also make the carpeting moldable and shape-retaining, and may also serve as a barrier to improve the sound attenuating properties of the carpeting.

Conventional vehicle carpeting typically includes an ethylene-vinylacetate (EVA), polyethylene (PE), or polyvinyl-chloride (PVC) layer which serves as a barrier sheet. Unfortunately, there are several drawbacks associated with the use of EVA, PE, and PVC layers in these vehicle applications. For example, EVA, PE, and PVC are non-porous materials which can be relatively heavy when applied to carpeting, dash insulators, and other interior trim components.

Various sound attenuating materials have been developed for use in reducing noise levels within passenger compartments of vehicles. For example, U.S. Pat. No. 4,851,283 to Holtrop et al., proposes a thermoformable laminate for use in headliners. The headliner comprises a non-woven fabric bonded to a foamed polymer sheet. The fabric is formed from a blend of low melting staple fibers and high melting staple fibers.

U.S. Pat. No. 5,298,694 to Thompson proposes a non-woven acoustical insulation web. The web comprises thermoplastic fibers, and particularly a blend of melt-blown microfibers and crimped bulking fibers.

U.S. Pat. No. 5,677,027 to Masuda et al. proposes a sound insulating structure comprising a covering layer, a panel, and a cushioning layer. The cushioning layer comprises a first fiber such as polyethylene terephthalate (PET) and a second fiber that is of a shell-core construction wherein the majority of the core is PET.

U.S. Pat. No. 5,817,408 to Orimo et al., proposes a sound insulating structure which includes low and high density thermoplastic fibers. PET is preferred as a thermoplastic synthetic fiber.

U.S. Pat. No. 4,529,639 to Peoples, Jr. et al. proposes a molded foam-backed carpet assembly which includes a carpet layer, a moldable thermoplastic polymer layer and one or more foam pads fusibly bonded to the thermoplastic layer and extending over less than the entire surface of the thermoplastic polymer layer to provide desired cushioning and sound and thermal insulation only in preselected areas of the carpet.

In general, the ability of conventional vehicle carpeting to attenuate sound increases as the amount of material increases. Unfortunately, increased carpeting material often increases the weight as well as the cost of vehicle carpeting, which is typically undesirable. Accordingly, there is a continuing need for carpet materials for use within vehicles that exhibit good sound attenuating properties, that are also lightweight and low in cost and which may be tailored to conform to local geometry and acoustic requirements. This tailoring may include the use of multiple materials disposed as multiple layers some of which may be sound absorbing and others acting as a barrier. The layers may further be provided only in local areas to match the location of the source of the noise or may cover the entire carpet backing layer.

SUMMARY OF THE INVENTION

In view of the above discussion, a light weight acoustic carpet assembly comprising porous carpet backed by a primary sound reducing layer and including secondary sound reducing absorbers or insulators, and methods of producing same are provided. According to embodiments of the present invention a primary layer of thermoplastic fibrous material (woven or non-woven) is first provided. The primary layer has opposite first and second sides, with fiber (e.g., yarn, etc.) tufts extending outwardly from the first side. The primary layer may be heated (although not required) to a predetermined temperature (e.g., about 150 degrees F. to about 250 degrees F.). A secondary backing layer of thermoplastic material (e.g., polyethylene, ethylene vinyl acetate, etc.) at a temperature of between about 350 degrees F. and about 500 degrees F. is applied to the second side of the primary layer such that the secondary backing layer penetrates the primary layer up to about 90% of a thickness of the primary layer and forms a carpet backing. The carpet backing is then heated to a temperature sufficient to cause the carpet backing to achieve a fluid state. The heated carpet backing is then subjected to sufficient vacuum such that air is drawn through the heated carpet backing to create a porous carpet structure. A sound reducing layer of material is applied to the carpet backing along with secondary sound reducing absorbers or insulators and the composite formed to shape to provide a light weight acoustic carpet assembly having both tailored geometry and tailored acoustical performance. The term "sound reducing layer" is therefore defined as including any material which might absorb, attenuate, insulate, or serve as a barrier to sound.

According to embodiments of the present invention, the layer of primary sound reducing material applied to the porous carpet backing may hold the porous carpet backing open such that air may flow therethrough and may help maintain the porosity of the composite during reheating and molding by preventing the thermoplastic from forming a film, as well as providing additional mechanical strength. The layer of primary sound absorbing material may be fibrous material comprising natural fibers, man-made fibers, waste fibers and blends of thereof. The layer of primary sound reducing material may also be a foam layer which is adhered to or poured directly against the carpet backing. In some instances, the foam layer may penetrate the carpet backing somewhat and act as a barrier. This primary sound reducing layer may optionally be localized rather than providing full coverage behind the backing layer.

According to embodiments of the present invention, additional secondary sound absorption or insulation may be applied locally to the backside of the layer of sound reducing material to tune the acoustical performance of the composite to preferably match the sources of noise. The secondary sound reducing absorbers or insulators may comprise preformed shapes of efficient insulating material which may provide specific geometry and sound attenuation to specific local areas of the vehicle floor. Preferably, the secondary sound reducing absorbers may be sound and/or heat insulators, such as foam, fibrous or heavy layer (highly filled) materials, which fill in recesses such as foot wells in a vehicle floor to provide a smooth first surface carpeted floor. The secondary sound reducing absorbers or insulators may also be a foam composition poured-in-place directly onto the primary sound reducing layer and may partially penetrate that layer to act as a barrier or sound absorber.

The light weight acoustic carpet assembly comprising porous carpet backed with a preferably full sound reducing layer and including secondary sound reducing insulators, according to embodiments of the present invention, may provide improved sound deadening and absorption properties within vehicles since the shape and sound attenuating properties may be tailored to the specific vehicle requirements. Moreover, the lightweight acoustic carpet assembly, according to embodiments of the present invention, may have reduced overall weight without sacrificing sound attenuating properties due to the efficient use of materials.

BRIEF DESCRIPTION OF THE DRAWINGS

The accompanying drawings, which form a part of the specification, illustrate embodiments of the present invention. The drawings and description together serve to fully explain the invention.

DETAILED DESCRIPTION OF THE INVENTION

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

In the drawings, the thickness of lines, layers and regions may be exaggerated for clarity. It will be understood that when an element such as a layer, region, substrate, or panel is referred to as being "on" another element, it can be directly on the other element or intervening elements may also be present. In contrast, when an element is referred to as being "directly on" another element, there are no intervening elements present. It will be understood that when an element is referred to as being "connected" or "attached" to another element, it can be directly connected or attached to the other element or intervening elements may also be present. In contrast, when an element is referred to as being "directly connected" or "directly attached" to another element, there are no intervening elements present. The terms "upwardly", "downwardly", "vertical", "horizontal" and the like when used herein are for the purpose of explanation only.

Embodiments of the present invention provide a light weight acoustic carpet assembly for use within vehicles, such as automobiles, and methods of producing same. Porous carpet according to embodiments of the present invention is particularly useful for reducing sound produced within a vehicle and for serving as a barrier to sound emanating from sources external to a vehicle. The addition of a full sound reducing layer and secondary sound reducing absorbers or insulators further improve acoustic performance and provide an ability to tailor or tune the performance to a specific geometry or vehicle application. Exemplary automotive applications within which a lightweight acoustic carpet assembly, produced according to embodiments of the present invention may be utilized include, but are not limited to, floor coverings, trunk liners, spare tire covers, dash liners, package tray trim, engine side absorbers, etc. Non-tufted carpeting may be provided with a porous structure according to embodiments of the present invention. The present invention is not limited to providing porosity within tufted carpeting as non-woven or woven covering surfaces may also be used.

Figure 1:
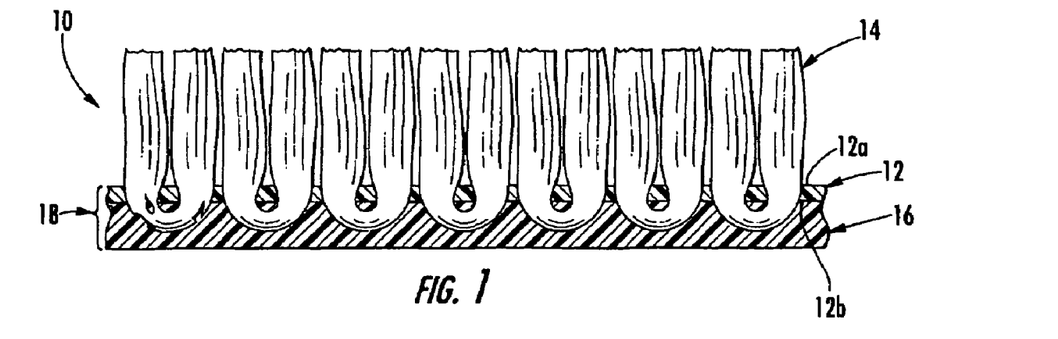
FIG. 1 is a cross-sectional view of a portion of tufted carpet, wherein a secondary layer of thermoplastic material has been added to a primary layer of thermoplastic material to form a carpet backing, according to embodiments of the present invention.

Referring now to FIG. 1, a cross-sectional view of a portion of a tufted carpet 10 is illustrated. The tufted carpet includes a primary surface layer 12 of preferably thermoplastic fibrous material having opposite first and second sides 12a, 12b. Yarn tufts 14 extend outwardly from the primary layer first side 12a, as illustrated. The primary layer 12 may be a woven matrix of thermoplastic fibrous material or a non-woven matrix of thermoplastic fibrous material (e.g., spunbonded or spunlaced), etc. Fibrous materials from which the primary layer 12 may be formed preferably include any natural or synthetic material compatible with a tufting process and that can withstand processing temperatures in excess of 200 degrees F., and preferably in excess of 400 degrees F. Exemplary thermoplastic fibrous materials from which the primary layer 12 may be formed include, but are not limited to, polyester, nylon, polypropylene, and/or blends thereof, and are available from Freudenburg Spunweb Co., Durham, N.C. and Colbond Geosynthetics, Enka, N.C.

Tufted carpet utilized in accordance with embodiments of the present invention preferably has tuft densities of between about one-eighth gauge and about one-sixteenth gauge. As is known to those skilled in the art, the term "gauge" refers to the number of rows of tufts per unit of measure. For example, one-tenth gauge means that there is a row of tufts every one-tenth of an inch. However, various tuft densities may be utilized. Embodiments of the present invention are not limited to a particular tuft density or to a particular range of tuft densities. The greater the tuft density, the greater the ability to pull air through a carpet such that the material structure of the carpet can be modified, as will be described below.

Typical nonwoven carpet for automotive applications range between about 4 and about 30 ounces per square yard, but are not limited to this range. Nonwoven carpet may be composed of various fiber types including, but not limited to, polyester, nylon, polypropylene, wool, cotton, and blends thereof.

Figure 2:
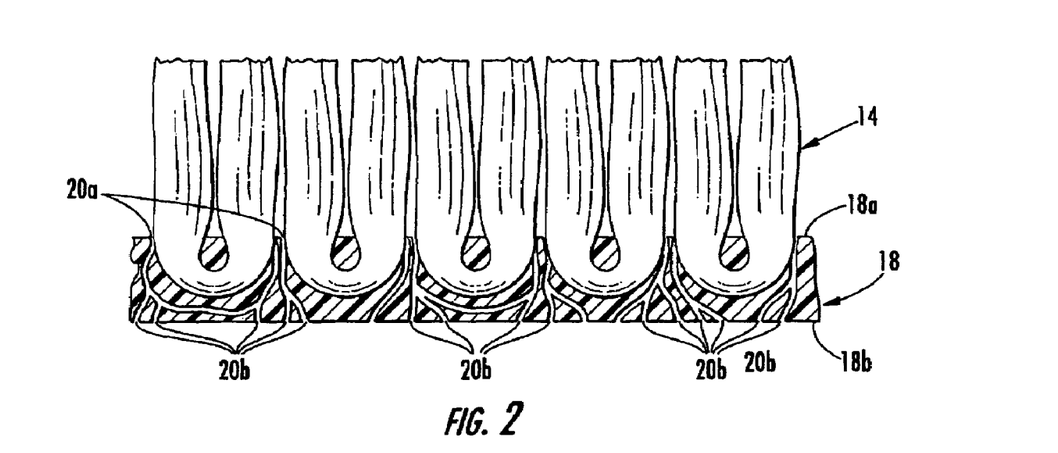
FIG. 2 is an enlarged view of a portion of the carpeting of FIG. 1 illustrating air channels formed within the carpet backing in accordance with embodiments of the present invention.

A secondary backing layer (or precoat) 16 of preferably thermoplastic material is attached to the primary layer second side 12b as illustrated. The secondary layer 16 is attached to the primary layer 12 in a heated condition such that the secondary layer 16 penetrates the primary layer 12 up to about 90% of a thickness of the primary layer 12 and forms a carpet backing, generally referred to as 18. FIG. 2 illustrates the carpet backing 18 as a single layer of material after the secondary backing layer 16 has penetrated the primary layer 12.

The secondary backing layer 16 may preferably be polyethylene (e.g., linear low density polyethylene (LLDPE), low density polyethylene (LDPE), medium density polyethylene (MDPE), high density polyethylene (HDPE)), ethylene vinyl acetate (EVA), polyester, polyolefin, and blends thereof, as well as other polymers capable of meeting the process requirements for extrusion and reheat, including TPO (thermoplastic olefin), TPE (thermoplastic elastomer), and ESI (ethylene styrene interpolymer), and blends thereof. An exemplary secondary backing layer 16 material is a 220 melt index low density polyethylene, such as AT 192, available from AT Polymers, Brampton, Ontario, Canada. The secondary backing layer 16 material may have a melt index range of between about 4 and about 500 melt index. However, lower or higher melt indexes may be used if they meet the process requirements. The secondary layer 16 material may be applied in an amount of between about 5 ounces per square yard and about 14 ounces per square yard.

As will be described below, the carpet backing 18 has a porous structure caused by forcing air through the carpet backing 18 when in a fluid or semi-fluid state. FIG. 2 is an enlarged view of a portion of the carpet 10 of FIG. 1 that illustrates air channels 20 that have been created through the carpet backing 18. Air channel formation originates from holes created by the tufts 14 in the primary layer 12 (FIG. 1). Thus, the greater the tuft density, the greater the number of air channels 20 that can be created and, thus, the greater the porosity of the carpet backing 18. Air channels 20 extend through the carpet backing 18 and terminate at respective apertures 20a, 20b in the respective sides 18a, 18b of the carpet backing 18.

Figure 3:
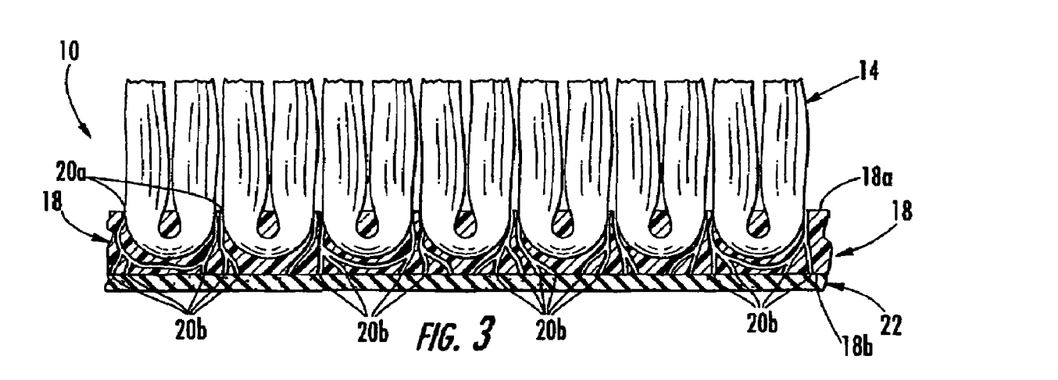
FIG. 3 illustrates the porous tufted carpet of FIG. 2 with the primary sound reducing layer attached to the carpet backing.

According to embodiments of the present invention, a layer 22 of primary sound reducing material may be attached to the carpet backing 18, as illustrated in FIG. 3. The layer 22 may preferably have a porous configuration and may be configured to hold the porous carpet backing 18, having air channels 20 formed therein, open such that air can flow therethrough. The sound reducing layer 22 may be of any composition, but is preferably fibrous, including but not limited to, polyester, nylon, shoddy, waste fibers, etc. Preferably, the primary sound reducing layer 22 is a felt which is porous and has good sound attenuating properties, for instance a 20 oz. per sq. yd. needled waste fiber product, about 0.5 inches in thickness, from the Montgomery N.C. plant of Collins & Aikman, or a 20 oz. per sq. yd. needled product of 50% bicomponent fibers and 50% 6 denier Mad Dog from the Montgomery N.C. plant of Collins & Aikman. Alternatively, the layer may be, for instance, a 27 oz. per sq. yd. shoddy, about 0.375 inches in thickness, such as Maratex® from Janesville-Sachner Group. The primary sound reducing layer 22 may also comprise a foam having the desired acoustical properties that is adhered to or poured directly behind the carpet backing layer to provide sound absorption or act as a barrier. In the case of a pour-in-place foam which is molded directly behind the carpet backing, the foam may penetrate the backing somewhat and function as a barrier. The foam may be open celled, closed celled, in sheet or cast form, attached to or lying behind the carpet backing layer. The addition of layer 22 also provides a thicker cross section that allows more area for the polyethylene coating. The more area/polyethylene, the stiffer the composite can be while maintaining porosity. In addition, the layer 22 can provide additional mechanical strength to the carpet backing 18. The layer 22 is configured to be attached to a vehicle panel (e.g., a floor panel) in contacting face-to-face relationship therewith.

The layer 22 may further serve the function of a binder such that the porous carpet backing can maintain a shape imposed upon it via molding and/or other forming operations.

Figure 4:
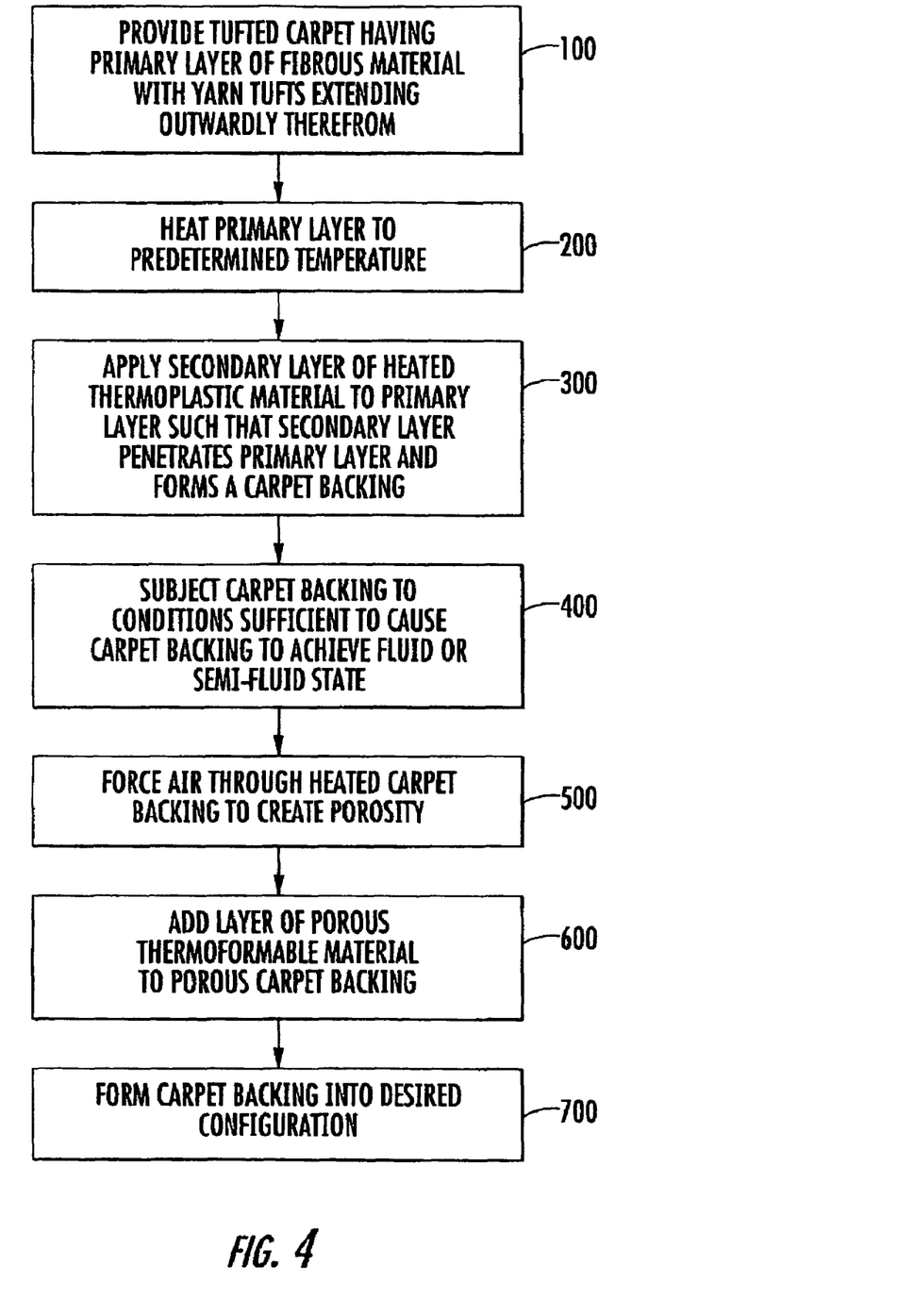
FIG. 4 is a flowchart of operations for producing porous tufted carpeting according to embodiments of the present invention.

Referring now to FIG. 4, operations for producing porous tufted carpet for use as a lightweight acoustic carpet assembly, according to embodiments of the present invention, are illustrated. A carpet consisting of a primary layer of fibrous material (e.g., a woven or non-woven matrix of thermoplastic fibers) preferably with yarn tufts extending outwardly from a first side thereof is provided (Block 100). The yarn tufts preferably have a density of between about one-eighth gauge and about one-sixteenth gauge.

The primary backing layer may be heated to a predetermined temperature (Block 200). An exemplary range is between about 150 degrees F. and about 280 degrees F., and a particularly preferred range is between about 160. degree. F. and about 220 degrees F. However, it is not required that the primary layer be heated.

A secondary backing layer of thermoplastic material having a temperature of between about 350 degrees F. and about 500 degrees F. is applied (e.g., via extrusion, etc.) to the primary layer second side such that the secondary backing layer penetrates the primary layer and forms a carpet backing (Block 300). A particularly preferred temperature range for the secondary layer is between about 400 degrees F. and 450 degrees F.

The secondary backing layer is preferably applied in the amount of between about 5 and 14 ounces per square yard. However, other application ranges may be utilized without limitation. Preferably, the secondary backing layer penetrates the primary layer by up to about 90% of the thickness of the primary layer. As described above, exemplary thermoplastic materials which may be used as a secondary layer include, but are not limited to, LLDPE, LDPE, MDPE, HDPE, polyester, polyolefin, etc.

The carpet backing is then subjected to conditions sufficient to cause the carpet backing to achieve a fluid or semi-fluid (i.e., flowable) state (Block 400). Thermoplastic materials have a wide range of melt flow rates. High melt flow rate materials typically flow easier and form air channels more easily than low melt flow rate materials. Accordingly, processing temperatures are dependent on materials utilized. Reheat temperature required will be dependent upon the thermoplastic coating material and will vary accordingly. Other ways of causing the carpet backing to achieve a fluid state may include applying microwave, infrared, or other electromagnetic energy to the carpet backing.

Once in a fluid or semi-fluid state, air flow of sufficient flow and velocity is forced through the heated carpet backing to create porosity therein (Block 500). According to embodiments of the present invention, air flow may be provided through the heated carpet backing by subjecting the carpet backing to vacuum. The vacuum causes air to be drawn through the carpet backing thereby creating porosity through the entire carpet backing. Vacuum may range from between about 0 inches of mercury to about 15 inches of mercury, depending on the particular types of material in the carpet backing and depending on the temperature of the carpet backing. Other methods of providing porosity in heated carpet backing may be utilized as well, such as forced air (or other fluids) flow via fans, nozzles, etc. Embodiments of the present are not limited to subjecting the heated carpet backing to vacuum.

According to embodiments of the present invention, a layer of preferably porous sound reducing material may be added to the porous carpet backing to provide improved acoustic performance as well as mechanical strength and/or to control the porosity of the composite (Block 600). According to embodiments of the present invention, the layer of preferably porous sound reducing material may preferably include fibrous material selected from the group consisting of natural fibers, man-made fibers, waste fibers and blends thereof or may comprise a foam layer, such as polyurethane or polyolefin. The composite of sound reducing layer and carpet backing may also be formed into various configurations as required (Block 700). Exemplary forming operations include trimming the composite to specified dimensions, rolling the composite into rolls, cutting the composite into specified sizes and lengths, and molding/fabricating the composite into a three-dimensional carpeting assembly which generally corresponds to the configuration of at least a portion of a vehicle floor and/or trunk, as would be understood by those skilled in the art.

Figure 5:
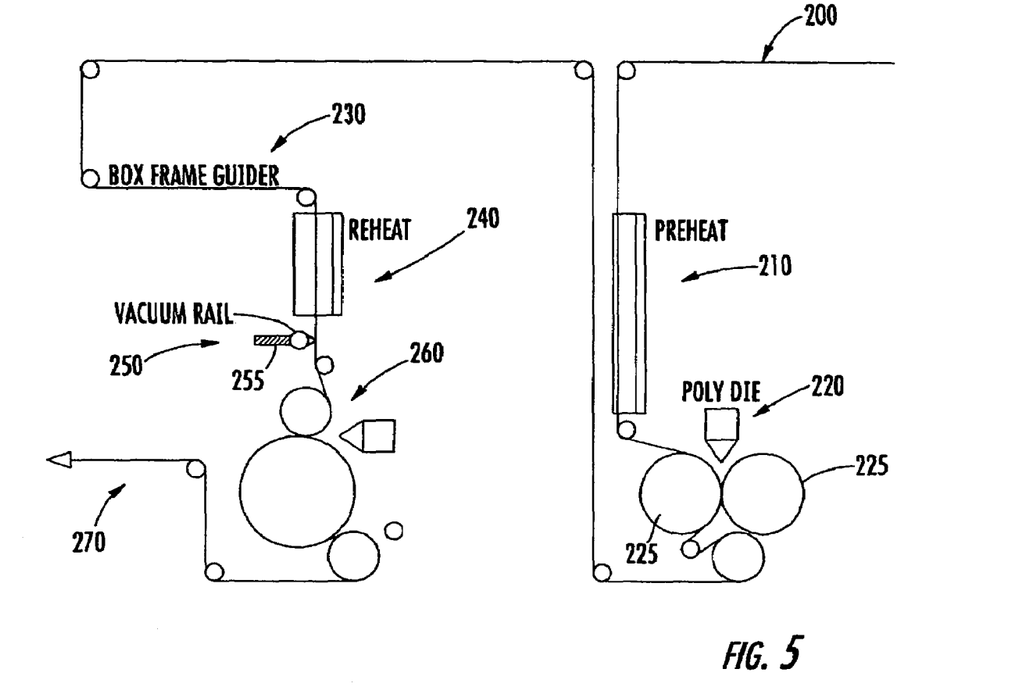
FIG. 5 is a block diagram that illustrates extrusion systems and processes for forming porous tufted carpeting according to embodiments of the present invention.

FIG. 5 is a block diagram that illustrates extrusion systems and processes for forming porous tufted carpet according to embodiments of the present invention. At 200 rolls of tufted carpet 10 (i.e., carpet having a primary layer with a plurality of tufts extending from a side thereof as illustrated in FIG. 1) are joined together (e.g., sewn together, etc.) to facilitate continuous extrusion processing. At 210 the primary surface layer 12 (FIG. 1) may or may not be heated to achieve the desired result. If heat is required, the typical heat range is between about 150 degrees F. and 280 degrees F., although other temperatures may be utilized.

At 220 a secondary backing layer 16 (FIG. 1) of thermoplastic material having a temperature of between about 350 degrees F. and about 500 degrees F. is extruded onto the primary layer 12 such that the secondary layer 16 penetrates the primary layer 12 and forms a carpet backing 18 (FIGS. 1–2). Preferably, rolls 225 have a temperature within the range of between about 55 degrees F. and about 120 degrees F. However, the higher the temperature of the rolls 225, the more the secondary layer 16 of thermoplastic material penetrates into the primary layer 12.

At 230 the carpet backing 18 is guided via a box frame guider that is configured to ensure a consistent seal of the carpet backing with a vacuum rail (described below). At 240 the carpet backing 18 is heated to a temperature sufficient to cause the carpet backing 18 to become flowable (i.e., achieve a fluid or semi-fluid state). The temperature required to achieve a fluid/semi-fluid state is dependent on the carpet backing material. A typical heating range is between about 230 degrees F. and about 270 degrees F. Typically, higher temperatures will produce a more porous carpet backing.

Figure 6:
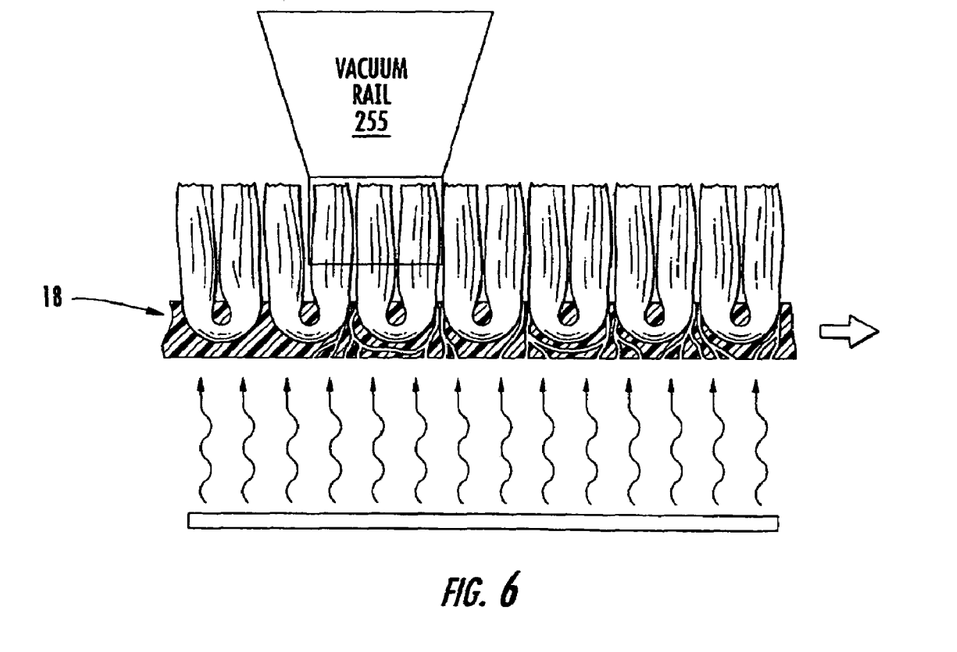
FIG. 6 illustrates the carpet backing of FIG. 1 being passed through a vacuum system that is configured to draw air through the carpet backing according to embodiments of the present invention.

At 250 the heated carpet backing passes adjacent to a vacuum rail 255 having a slot therein and which is configured to generate vacuum of between about 0–15 inches of mercury through the slot. FIG. 6 illustrates the carpet of FIG. 1 passing adjacent to a vacuum rail 255 that is configured to draw air through the carpet backing 18 to form air channels 20.

Figure 7:
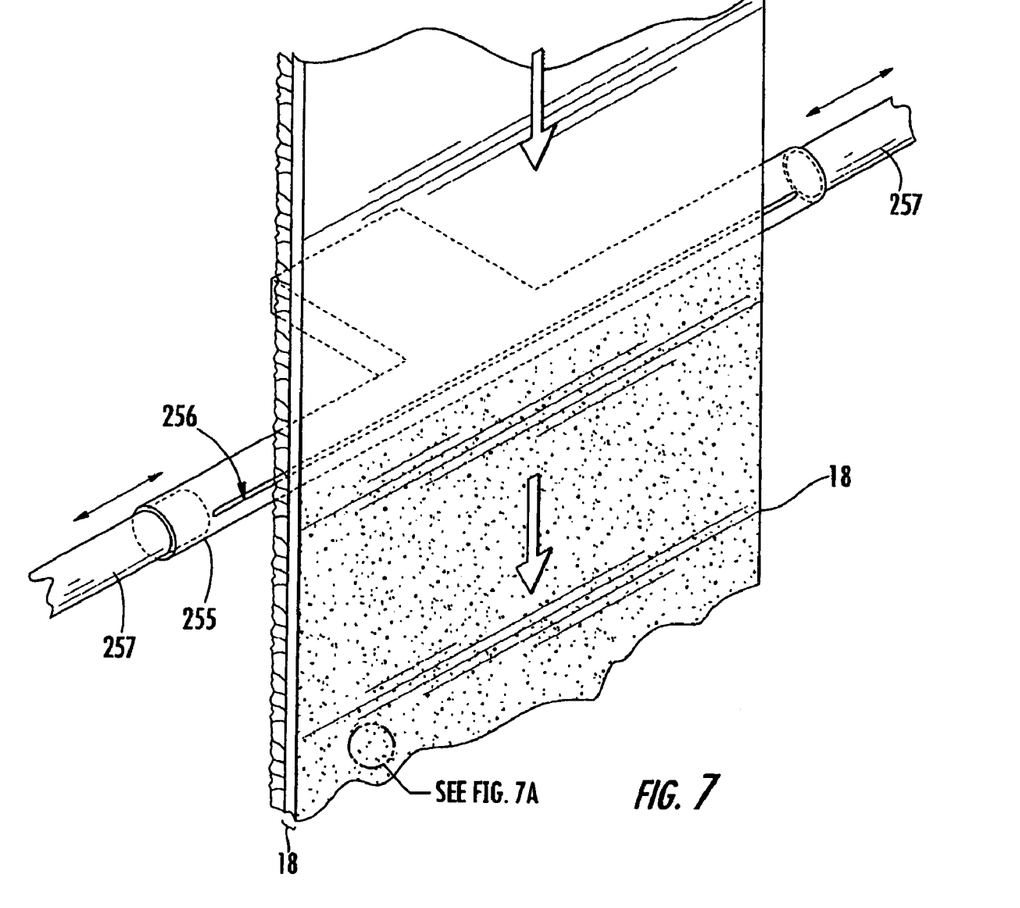
FIG. 7 is an enlarged perspective view of a vacuum rail that can be utilized in accordance with embodiments of the present invention to apply vacuum to a heated carpet backing to create porosity therein according to embodiments of the present invention.
Figure 7A:
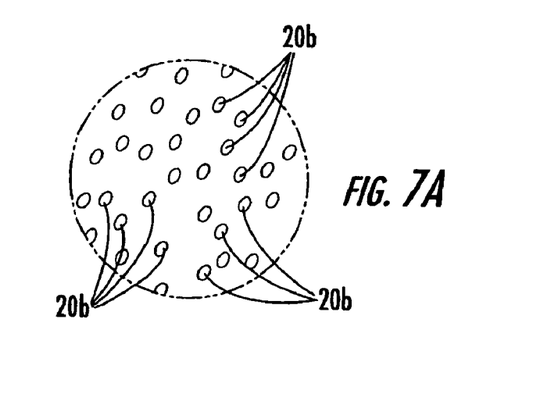
FIG. 7A is an enlarged portion of the carpet of FIG. 7 that illustrates apertures of air channels that have formed in the backing of the carpet as the carpet passes by the vacuum rail.

FIG. 7 illustrates an exemplary vacuum rail 255 that can be utilized in accordance with embodiments of the present invention to apply vacuum to a heated carpet backing to create a porous structure therein. FIG. 7A is an enlarged portion of the carpet of FIG. 7 that illustrates apertures 20b of air channels 20 that have formed in the backing 18 of a carpet 10 as the carpet 10 passes by the vacuum rail 255.

The illustrated vacuum rail 255 includes a slot 256 having a width that is variable so as to be adjustable to the width of a carpet backing. In the illustrated embodiment, slot width is controlled by deckles 257 that slide within the rail 255 to close or open the slot 256 to a desired width. According to other embodiments of the present invention, deckles 257 may be configured to slide external to the rail 255 to close or open the slot 256 to a desired width. Deckles 257 may have various shapes and configurations and may be controlled in various ways.

The vacuum rail 255 may be in communication with virtually any type of vacuum source capable of generating between about 0 and 15 inches of mercury. An exemplary vacuum source is a Vacuum Blower Package, HS Design, available from Industrial Accessories Company, Mission, Kans. Various ways of applying vacuum may be utilized. Embodiments of the present invention are not limited to the illustrated vacuum rail 255.

Referring back to FIG. 5, at 270 various processing operations may occur after the porous carpet backing 18 is formed. For example, the porous carpet backing may be trimmed to a desired width and/or length, rolled into rolls, or cut into blanks of various lengths. In addition, molding operations may occur to create a molded carpet assembly configured to be installed within a vehicle.

Figure 8:
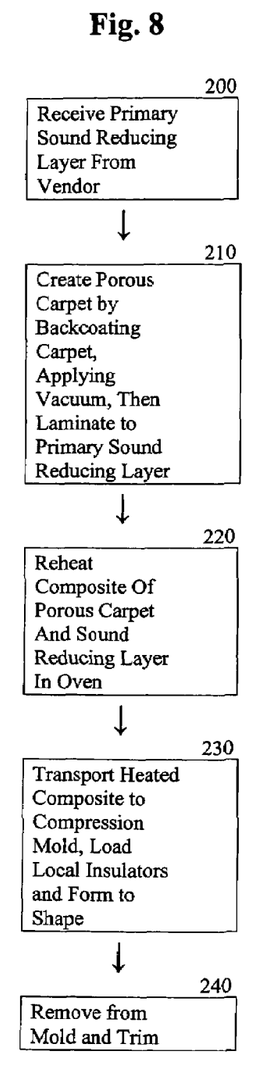
FIGS. 8, 8A and 8B are flow diagrams of alternate processes to provide the lightweight acoustic carpet assembly of the present invention.
Figure 8A:
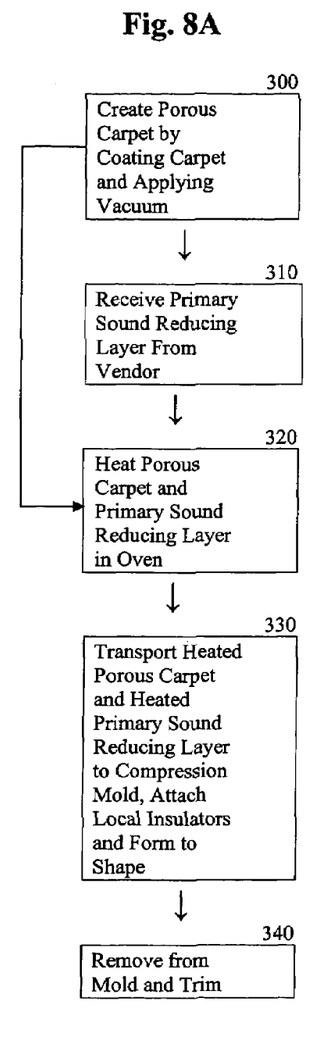
Figure 8B:
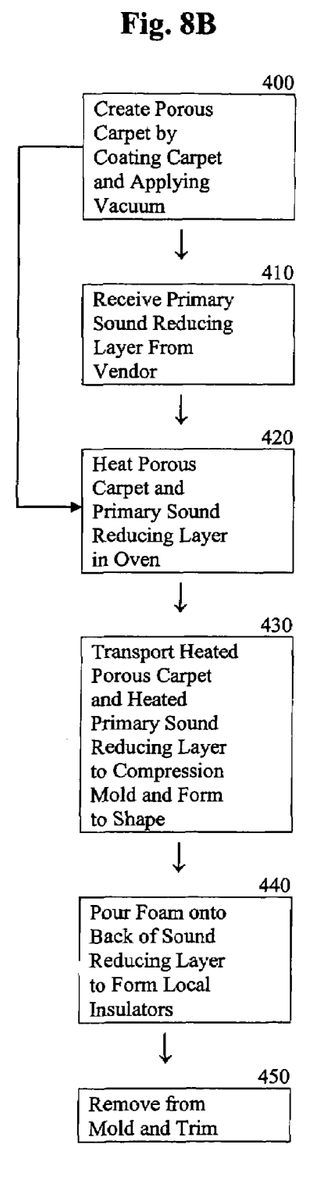
Figure 9:
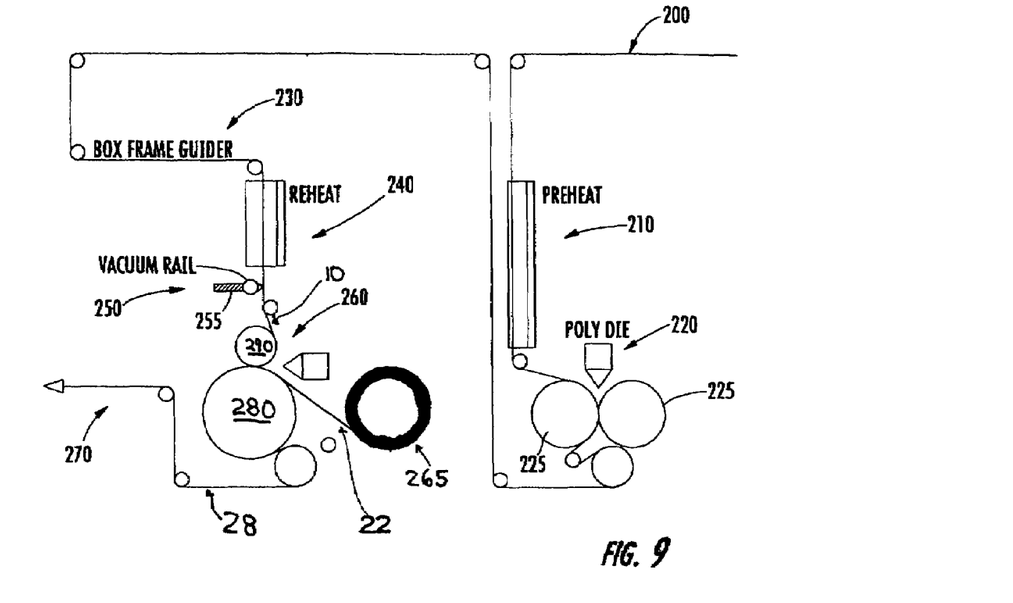
FIG. 9 is a schematic diagram that illustrates extrusion systems and processes for forming porous tufted carpeting and combining such with the primary sound reducing layer as described in FIG. 8, according to embodiments of the present invention.

FIGS. 8, 8A and 8B describe three alternate methods of manufacturing the lightweight acoustic carpet assembly of the present invention. In FIG. 8, the sound reducing layer 22 is received from a vendor (Block 200) and in Block 210 the, preferably felt, sound reducing layer 22 is laminated to the porous carpet 10 just after the carpet has received its' porous backing, preferably after the vacuum has been applied to create the porosity in the secondary layer (precoat) 16 and the carpet backing layer 18 is being formed. This is further illustrated schematically in FIG. 9, which is similar to FIG.5, except that a roll 265 of sound reducing felt 22 has been fed into the process flow such that the felt layer 22 is laminated to the porous carpet 10 on roll 280 to form a composite 28. The composite 28 is cooled by passing between cooling rolls 280, 290 and cut into blanks or rolled into roll goods to be used as a feedstock for the subsequent molding process. Alternatively, the composite may be directly fed to a molding line for further processing.

As shown in Block 220, the composite 28 is next heated, preferably in a hot air oven, although other means of heating, including but not limited to, infrared, microwave, electromagnetic, etc. may be used. The composite 28 is heated sufficiently that it may be formed to shape in a compression mold, preferably to a range of about 300 degrees F. to about 340 degrees F. The heated composite 28 is then transported to a forming mold (Block 230) for forming the composite into the final carpet assembly configuration.

Figure 13:
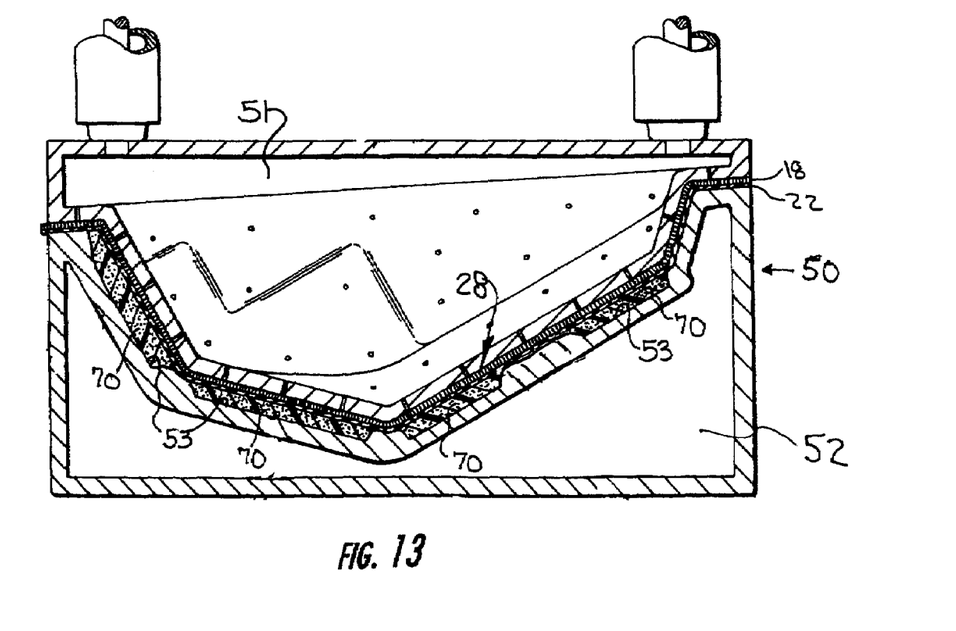
FIG. 13 is a cross-sectional view of a mold assembly for forming the light weight acoustic carpet assembly of the present invention.

A forming mold 50 is provided, see FIG. 13, which is comprised of an upper portion 51 and lower portion 52 which cooperate to form a cavity space having the shape of the finished light weight acoustic carpet assembly. Additionally, recessed areas or wells 53 may be provided in the lower mold portion 52 to receive secondary sound reducing absorbers or insulators 70. The secondary sound reducing insulators 70 provide additional sound and/or heat insulation or absorption in selected areas of, say a floor carpet for a vehicle, and may be provided in preformed or die cut shapes that correspond to that area of the vehicle and to the recessed area in the mold 50. The secondary sound reducing insulators may include an adhesive layer (not shown) which is preferably activatable by heat. The adhesive layer may include, but not be limited to, a powder coating such as Epolene C16 from Eastman Chemical Company, an adhesive web, for instance of polyethylene, a hot melt adhesive or a pressure sensitive adhesive (PSA) film. The secondary sound reducing insulators may optionally be attached by mechanical means (e.g. Velcro) or if of foam construction may be poured-in-place on the back of the primary sound reducing layer. As noted in Block 230, the secondary sound reducing insulators 70 are loaded into the mold lower portion 53 with the side to be attached facing outward, then the heated composite 28 is loaded into the mold with the tufted carpet surface facing outward. Upon closing the mold the adhesive or other attachment method preferably bonds or fastens the secondary sound reducing absorbers/insulators to the primary sound reducing layer. The heat from the composite activates the adhesive, attaching the secondary sound reducing absorbers/insulators 70 to the backside of the primary sound reducing layer 22 and forming the assembly into the desired shape. Upon sufficient cooling, the assembly is removed from the mold 50 and trimmed (Block 240), ready for shipment to as customer.

Figure 10:
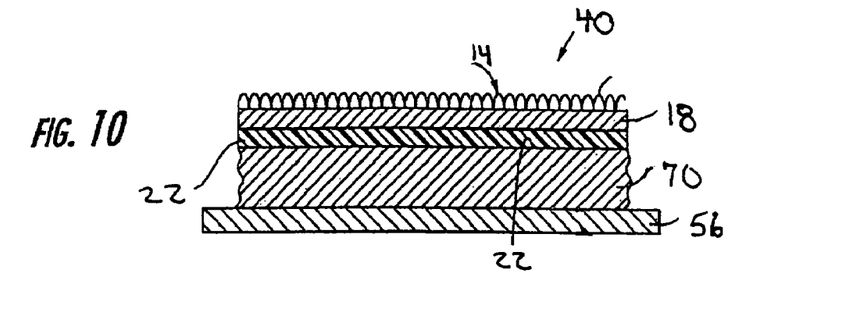
FIG. 10 is a cross-sectional view of a portion of a light weight acoustic carpet assembly according to embodiments of the present invention.

Referring now to FIG. 10, a cross-sectional view of a portion of the light weight acoustic carpet assembly 40, according to embodiments of the present invention, is illustrated. The sound absorbing carpet assembly 40 includes a porous carpet layer 18 bonded to a sound reducing layer 22 as described above. The illustrated carpet layer 18 preferably includes carpet tufts 14 extending from the surface of the carpet layer, although nonwoven or woven carpet may also be used. The porous carpet layer is in contacting face-to-face relationship with the sound reducing layer 22. As described herein, the sound reducing layer 22 preferably covers the entire backside of the porous carpet 18, however, this invention need not be limited in that manner as the sound reducing layer 22 may cover less than the full backside of the carpet backing layer 18. The sound reducing layer 22 may optionally comprise a barrier layer of either foam, fibers or a heavy layer (e.g. massback or other highly filled composition) construction.

The carpet assembly 40 is configured to be attached to a vehicle floor panel 56 in contacting face-to-face relationship therewith. As shown, the carpet assembly further includes one or more secondary sound reducing insulators or absorbers 70 which serve to provide sound and/or heat insulation to selected areas of the vehicle floor 56 in this case, and to accomodate local recessed areas in the vehicle floor such that a smooth outer surface is provided for the floor carpet 40.The secondary sound reducing insulators may be formed from any type of material including, but not limited to, foam (e.g., polyurethane foam, thermoplastic foam, etc.), mass-back, Marabond®, Maratex®, polyester fibers, cotton shoddy, and other sound absorbing or attenuating materials, but preferably sound insulating materials. Further, although disclosed herein as secondary sound reducing insulators 70, the secondary sound reducing insulating material may form a partial or full backing layer behind the sound reducing layer 22, as required by the specific vehicle application. The secondary sound reducing insulators 70 may further function as a sound barrier as required.

Figures 11, 12:
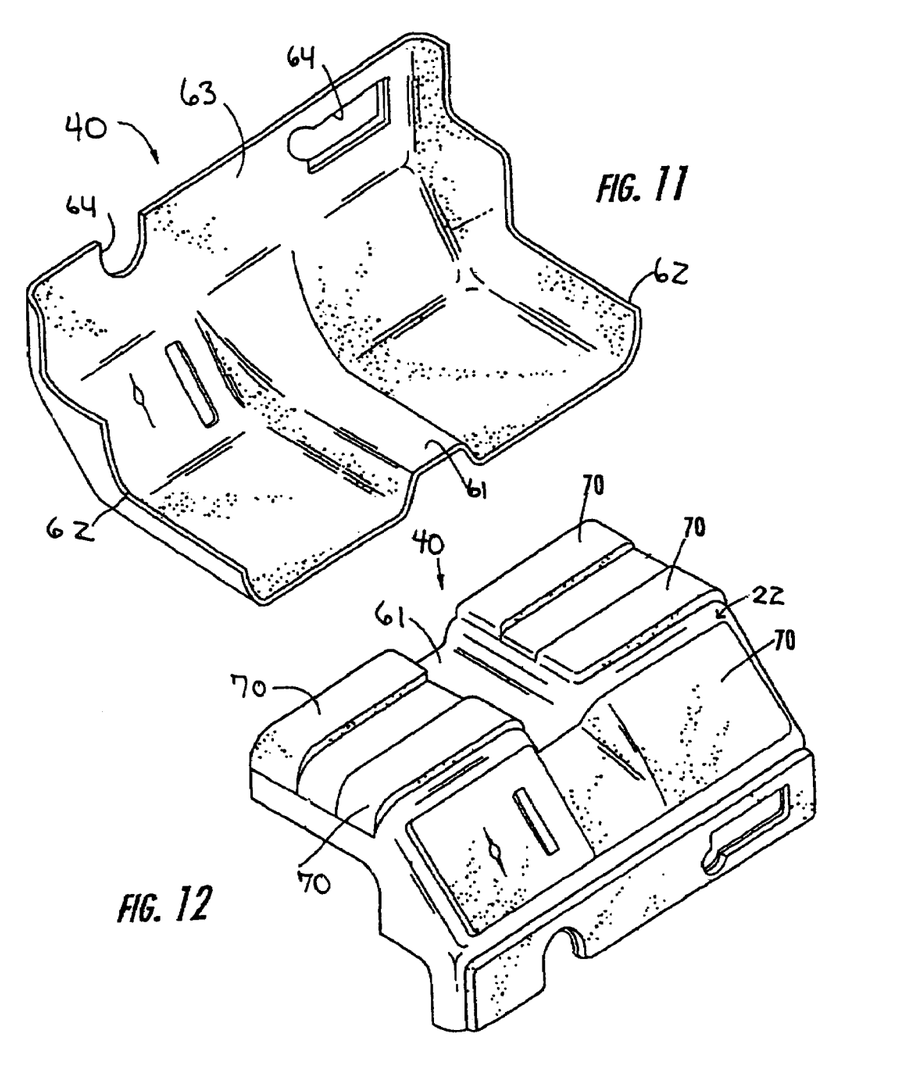
FIG. 11 is a perspective view of an exemplary molded carpet assembly for a vehicle according to embodiments of the present invention.
FIG. 12 is a perspective view of the backside of the molded carpet assembly of FIG. 11 according to embodiments of the present invention.

An exemplary light weight acoustic molded carpet assembly 40 is illustrated in FIG. 11. The illustrated carpet assembly 40 has a non-planar three dimensional molded configuration adapted to fit the front seat compartment floor of a vehicle and includes a raised medial portion 61 adapted to conform to the transmission hump, generally vertically extending side portions 62 adapted to fit beneath each door opening, and a front portion 63 adapted to fit along the inclined floorboard and vertical firewall areas of a vehicle. Various openings or cut-outs are provided, as indicated at 64, to receive air conditioning equipment, the steering column, pedals and the like. It is to be understood that the particular three dimensional configuration illustrated is merely for purposes of illustration. Carpet assemblies according to embodiments of the present invention may have various configurations and shapes depending on the floor configuration of a vehicle.

Referring to FIG. 12, a perspective view of the backside of the carpet assembly of FIG. 11 is shown, illustrating the placement of secondary sound reducing absorbers or insulators 70 added to one or more selected portions of the sound reducing layer 22 to form the carpet assembly 40. The secondary sound reducing insulators are preformed to shape, preferably die cut, and match the shape of corresponding recesses in the vehicle floor 56 to provide a smooth outer surface for the carpet assembly 40 when it is mounted to the vehicle floor 56.

Now turning to FIG. 8A, an alternate process for forming the carpet assembly 40 of the present invention is described wherein the porous carpet backing 18 is formed (Block 300) and stored for future use. The primary sound reducing material, preferably a roll or sheet of felt, as previously described, is provided (Block 310). Both materials, sound reducing layer 22 and porous carpet backing 18 in sheets or roll form are provided to an oven for heating (Block 320) and subsequent joining together in the forming mold (Block 330). The materials may be heated in a common oven or by separate means, but preferably the sound reducing layer 22 is heated in a hot air oven to a temperature of about 400 to 450 degrees F., and the porous carpet backing 18 is heated by infrared heater to a back surface temperature of about 400 to 450 degrees F. This allows for adequate bonding of the two layers together but minimizes the heat exposure to the outer tufted surface of the carpet. The two heated materials are delivered to the forming tool (Block 330) where the secondary sound reducing insulators 70 are loaded into the mold lower portion 53 (see FIG. 13) with the side to be attached facing outward, then the heated sound reducing material 22 followed by the heated porous carpet backing 18 are loaded into the mold 50 with the tufted carpet surface facing outward. Upon closing the mold and waiting for a few minutes, the heat from the sound reducing layer and carpet activates the adhesive, attaching the secondary sound reducing insulators 70 to the backside of the sound reducing layer 22, and the mold 50 forms the assembly into the desired shape. Upon sufficient cooling, the assembly is removed from the mold 50 and trimmed (Block 340), ready for shipment to as customer.

In FIG. 8B a second alternative process is described wherein the process proceeds as in FIG. 8A, but the secondary sound reducing absorbers/insulators 70 comprise a pour-in-place foam composition which is dispensed onto the backside of the porous carpet/primary sound reducing layer composite (Block 440). The porous carpet 12/primary sound reducing 22 composite is heated and formed to shape in a first mold (Blocks 430, 430) and the resulting formed composite is then transferred to a second mold where urethane precursors are poured onto the backside of the composite in areas where additional sound performance is desired and the mold closed. The precursors react to form the secondary sound reducing absorbers/insulators 70 (Block 440). Upon sufficient cooling, the assembly is removed from the mold and trimmed (Block 450), ready for shipment to as customer.

A light weight acoustic carpet assembly comprising porous preferably tufted carpeting bonded to a sound reducing layer with secondary sound reducing absorber or insulator selectively attached, according to embodiments of the present invention, can enhance sound attenuation and provide local tuning of both assembly geometry as well as sound attenuation. For example, sound generated within a vehicle can be absorbed by the assembly to provide a quieter environment within the vehicle. A porous carpet assembly formed in accordance with embodiments of the present invention can achieve between about 150 Rayls and about 10,000 Rayls of sound attenuation, and all increments therebetween, depending upon the composition of the various layers used. The addition of the secondary sound reducing insulators then improves upon this further in any selected location of the assembly.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

The invention claimed is:

1. A method of forming a light weight acoustic carpet assembly, comprising:
   providing a primary layer of fibrous material having opposite first and second sides and a thickness, and yarn tufts that extend outwardly from the first side;
   applying a secondary layer of thermoplastic material at a temperature such that the secondary layer penetrates the primary layer and forms a carpet backing;
   subjecting the carpet backing to conditions sufficient to cause the carpet backing to achieve a fluid state;
   subjecting the carpet backing to air flow sufficient to create a porous carpet backing;
   providing a first sound reducing layer;
   heating said porous carpet backing and said sound reducing layer;
   placing the sound reducing layer in contact with said porous carpet backing; and
   forming the sound reducing layer and porous carpet backing into a desired configuration.

2. The method of claim 1, wherein the carpet assembly further comprises one or more secondary sound reducing insulators located against selected areas of the first sound reducing layer in the forming mold.

3. The method of claim 2, wherein the secondary insulators may be sound absorbers.

4. The method of claim 2, wherein the secondary insulators may comprise any one or a combination of foam, a fibrous layer or a filled layer.

5. The method of claim 4, wherein the foam may be poured-in-place.

6. The method of claim 1, wherein the sound reducing layer may comprise a sound barrier.

7. The method of claim 1, wherein the primary layer of fibrous material comprises a matrix of thermoplastic fibers.

8. The method of claim 7, wherein the matrix comprises a woven matrix of thermoplastic fibers.

9. The method of claim 8, wherein the matrix comprises a non-woven matrix of thermoplastic fibers.

10. The method of claim 1, wherein a density of yarn tufts extending outwardly from the primary layer first side is between about one-eighth gauge and about one-sixteenth gauge.

11. The method of claim 1, wherein the step of applying a secondary layer of thermoplastic material at a temperature such that the secondary layer penetrates the primary layer and forms a carpet backing comprises heating the secondary layer to a temperature in the range between 350 degrees F. to about 500 degrees F.

12. The method of claim 1, further comprising heating the primary layer to a temperature of between about 150 degrees F. and about 280 degrees F. prior to applying a secondary layer of thermoplastic material thereto.

13. The method of claim 1, wherein subjecting the carpet backing to conditions sufficient to cause the carpet backing to achieve a fluid state comprises forming a fluid state in said carpet backing by heating the carpet backing to a temperature of between about 200 degrees F. and about 300 degrees F.

14. The method of claim 1, wherein the secondary layer of thermoplastic material comprises one of polyethylene, ethylene vinyl acetate (EVA), and blends thereof.

15. The method of claim 1, wherein the secondary layer of thermoplastic material penetrates the primary layer of fibrous material up to about 90% of a thickness of the primary layer.

16. The method of claim 1, wherein subjecting the carpet backing to air flow comprises subjecting the carpet backing to vacuum in a range of between about 0 inches of mercury and about 15 inches of mercury.

17. The method of claim 1, wherein the sound reducing layer comprises fibrous material selected from any one of a natural fiber, synthetic fiber, recycled fiber and blends thereof.

18. The method of claim 17, wherein the fibrous material comprises felt.

19. The method of claim 1, wherein the sound reducing layer comprises a foam.

20. The method of claim 19 wherein the foam is poured in place.

21. A method of forming a light weight acoustic carpet assembly, comprising:

providing a primary layer of fibrous material having opposite first and second sides and yarn tufts that extend outwardly from the first side;

applying a secondary layer of thermoplastic material at a temperature such that the secondary layer penetrates the primary layer and forms a carpet backing;

subjecting the carpet backing to conditions sufficient to cause the carpet backing to achieve a fluid state;

subjecting the carpet backing to air flow sufficient to create a porous carpet backing;

providing a sound reducing layer;

laminating said sound reducing layer to said porous carpet backing; and forming the sound reducing layer and porous carpet backing into a desired configuration.

22. The method of claim 21, wherein the step of forming includes heating.

* * * * *

UNITED STATES PATENT AND TRADEMARK OFFICE
CERTIFICATE OF CORRECTION

| | | |
|---|---|---|
| PATENT NO. | : 7,097,723 B2 | Page 1 of 1 |
| APPLICATION NO. | : 10/851479 | |
| DATED | : August 29, 2006 | |
| INVENTOR(S) | : Allison et al. | |

It is certified that error appears in the above-identified patent and that said Letters Patent is hereby corrected as shown below:

Title Page, Item (60): After "No." delete [60/333,595] and insert --60/333,594--.

Signed and Sealed this

Twenty-first Day of November, 2006

JON W. DUDAS
*Director of the United States Patent and Trademark Office*